United States Patent [19]

Otto et al.

[11] 4,456,666
[45] Jun. 26, 1984

[54] TITANIUM WIRE REINFORCED LEAD COMPOSITE ELECTRODE STRUCTURE

[75] Inventors: Neil C. Otto, Chicago; Herbert K. Giess, Hoffman Estates; Jeffrey W. Mainzer, Mt. Prospect, all of Ill.

[73] Assignee: GNB Batteries Inc., Mendota Heights, Minn.

[21] Appl. No.: 434,078

[22] Filed: Oct. 13, 1982

[51] Int. Cl.³ .............................................. H01M 4/66
[52] U.S. Cl. ..................................... 429/245; 429/241
[58] Field of Search .................... 429/245, 225–228, 429/241; 204/291, 292, 293; 420/563

[56] References Cited
U.S. PATENT DOCUMENTS

| | | | |
|---|---|---|---|
| 3,944,431 | 3/1976 | Ikari et al. | 429/245 |
| 3,989,539 | 11/1976 | Grabb | 429/245 X |
| 4,037,031 | 7/1977 | Jacob | 429/245 X |
| 4,136,235 | 1/1979 | de Nora | 429/245 X |
| 4,297,421 | 10/1981 | Turillon et al. | 429/225 |
| 4,346,153 | 8/1982 | Rigal et al. | 429/245 X |

*Primary Examiner*—Charles F. Lefevour
*Attorney, Agent, or Firm*—Augustus J. Hipp

[57] ABSTRACT

The present invention relates to a titanium wire reinforced lead composite electrode support structure for use in lead-acid batteries comprising a titanium wire reinforced cast lead composite having titanium wires embedded in a cast lead matrix. The composite support structure may be made in the form of a lead grid for use in Faure type batteries, as a support structure for tubular type batteries, or as plates for use in Planté type batteries.

17 Claims, 2 Drawing Figures

TITANIUM WIRE REINFORCED LEAD COMPOSITE ELECTRODE STRUCTURE

The Government has rights in this invention pursuant to Contract No. N60921-81-C-0231 awarded by the Department of the Navy.

BACKGROUND OF THE INVENTION

The present invention relates to a titanium wire reinforced lead composite electrode structure for use in lead-acid batteries.

Every lead-acid battery has a structure in both the positive and negative electrodes that supports the active material and provides current collection. Typically, this structure is a flat grid, but it could be tubes, baskets, flat plates, or a variety of other configurations. To serve its function the grid must be electrically conductive, have sufficient mechanical strength to support the dense active material, must maintain good electrical contact with the active material and have adequate corrosion resistance in the battery environment.

In most present commercial lead-acid batteries the grid is a lead alloy which is stronger than pure lead, and thus capable of supporting the active mass, typically lead and lead dioxide. Other materials have, of course, been considered. Each of these previously known methods of constructing grids has its drawbacks.

All known alloys of lead have greatly inferior corrosion properties compared to pure lead. Thus the electrode grid structure in the positive electrode corrodes over time, losing contact with the active material which causes the capacity of the battery to decline. In fact, the life-cycle of most lead-acid batteries is limited by this corrosion mechanism. Corrosion in the negative electrode on the other hand is generally not a problem. Also, one or more alloying elements in such lead alloys must be held within composition limits as close as 200 parts per million or less.

In the early 1960's there was some investigation into the use of titanium as the grid material in the positive electrode because of its excellent corrosion properties. For example, British Pat. No. 869,618 to Cotton et al discusses the use of titanium structure for lead-acid positive electrodes, employing a coating of noble metals to which the lead dioxide is subsequently applied. It is interesting to note that Cotton et al specifically teach that lead is not a suitable material to employ between the titanium and the active material.

While titanium has very poor corrosion properties in the negative electrode environment it has excellent corrosion properties in the positive electrode environment and could operate with essentially no corrosion. Additionally, titanium has a much lower density than lead and would decrease the weight of the battery. Interest in titanium waned, however, because of difficulties in getting good contact between the lead dioxide active material and the titanium grid. Despite expensive surface treatments and flash coating of noble metals the lead dioxide did not form a proper bond to the titanium grid.

More recently U.S. Pat. No. 4,282,922 to Hartmann disclosed the use of lead coated alumina fibers to provide a lead matrix composite to be used as the positive electrode structure for lead-acid batteries. The disclosure of Hartmann provides a method of using pure lead with its inherently better corrosion resistance.

The alumina fiber/pure lead composite grid appears to have more promise. The fiber reinforcement appears to impart the needed strength and the corrosion of the pure lead grid has been shown to be quite low in early tests. Experimental work to more fully characterize the corrosion properties is still being performed, however, two major drawbacks appear to make this system unattractive. The cost of this material is currently high, and there is little prospect that the cost can be reduced in the foreseeable future.

The main drawback, however, is the lack of a means to translate such technology into a production environment. In the laboratory, reinforced grids are made by placing a reinforcing fiber into each grid member cavity of a mold and then casting lead around the fibers. Such hand lay-up is very time consuming and would be impossible to do in a production facility. What would be needed would be a preform of the alumina fibers that could be dropped into a mold seconds before casting. The technology for joining ceramic fibers into such a preform does not now exist.

FIGURES

SUMMARY OF THE INVENTION

Figure 1:
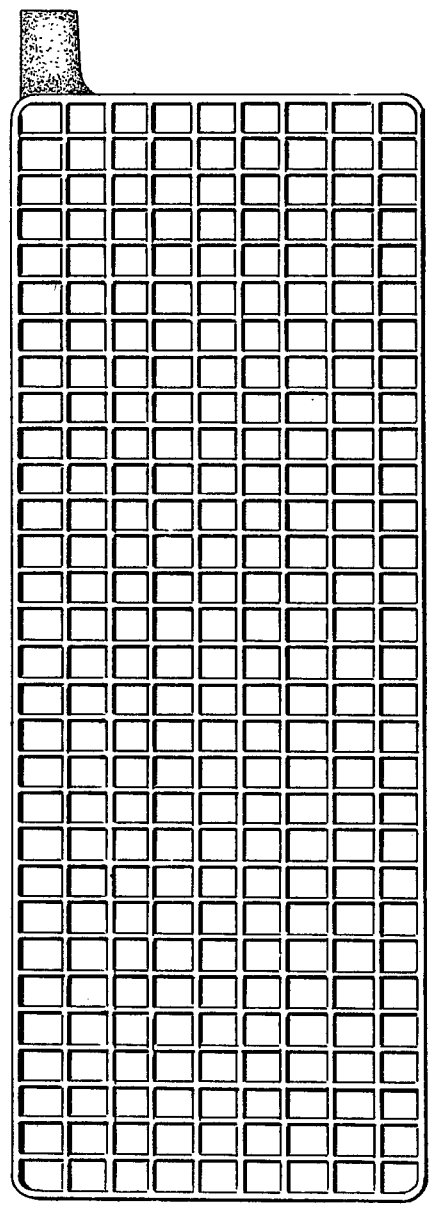
FIG. 1 illustrates a battery grid design of a type commonly employed in industrial battery cells.

The present invention provides a novel battery electrode structure for lead-acid batteries in which the grid is a titanium wire reinforced lead structure. The configuration and size of the electrode grid may be any size or design appropriate to the particular lead-acid cell being manufactured.

As used herein the term "titanium" or "titanium wire" shall be understood to include any size and all grades of pure unalloyed titanium such as ERTi-1 Welding Grade Titanium, ASTM Grades 1, 2, 3, 4 and 7 unalloyed titanium; and shall also be understood to include binary alloys of titanium and aluminum, binary alloys of titanium and tin, ternary alloys of titanium, aluminum and tin such as Ti-5Al-2.5Sn and other suitable alloys. In general, alloys of titanium with vanadium and molybdenum, or other alloying elements which might have a deleterious effect on the electrochemistry of a lead-acid battery are less suitable.

As used herein the term lead is generally intended to mean elemental lead, but should also be understood to include suitable dilute alloys of lead, e.g. those containing at least 98.5% lead, particularly those where the alloying element is added to achieve some effect other than strength, such as for example use of alloying elements which can be employed at low levels to achieve improved electrochemical efficiency. In particular lead antimony binary alloys having a relatively low antimony content are to be specifically understood as included in the term lead.

Low antimony lead alloys can provide "positive float" capabilities which allow the battery to be continuously charged at a very low rate (trickle charge) to maintain maximum battery capacity and be frequently discharged to shallow depths. With antimony free grids this trickle charge/shallow discharge routine can cause a drastic decline in capacity. On the other hand, where the battery is employed in a closed environment such as, for example, in a submarine, it is probably advisable that the antimony content not exceed about 1.25% so as to insure against the remote possibility of creating stibine ($SbH_3$), a poisonous gas, and excessive hydrogen ($H_2$) on charge.

In general, the grids of the present invention may contain from about 5 to about 30% by volume titanium, and preferably from about 10 to 20% by volume and may be constructed using a single titanium wire reinforcement or a tightly wound bundle of two or more thin titanium wires. The titanium wire is laid into each grid member in the frame of a suitable grid mold, the mold is closed, and the lead is then cast into the mold around the titanium wires. The casting is subsequently cooled, removed from the mold and then employed in a conventional manner to construct the battery cell.

The present invention has the advantage of using a lower cost, weldable, titanium reinforcement of a pure lead grid. The grid combines the excellent corrosion resistance of pure lead and titanium with high mechanical strength and good conductivity. A spot-welded titanium wire preform can be made which will allow this technology to be introduced into a manufacturing facility without major changes in manufacturing techniques or equipment.

A titanium reinforced pure lead grid can have a thinner cross-section and thus lower weight while having the same lifetime as a thicker alloy grid. Alternatively, a titanium reinforced pure lead grid could be made with the same cross-section as an alloy grid but would have an increased lifetime of perhaps as much as 200 or 300%. Also, casting pure lead around titanium reinforcement will eliminate the necessity for tightly controlled alloys of lead where one or more alloying elements must be held within composition limits of 200 parts per million or less.

While the preferred use of the novel grid of the present invention is in a positive electrode, it should be specifically noted that the grid also may be employed in negative electrodes. As noted earlier, previously known titanium grids tended to corrode when employed in the negative electrodes, however, the titanium reinforcement of the present invention is not exposed to the corrosive environment, and the grids of the present invention are, therefore, suitable for use in either positive or negative electrodes.

PREFERRED EMBODIMENTS

A series of positive electrode grid supports were constructed within the scope of the present invention. It should be noted that while the grid design illustrated by FIG. 1 was employed in the following examples, the specific grid design of FIG. 1 is illustrative only. Again noted earlier, the battery grid supports the active material and conducts electricity. Depending on the battery application the grid might be as small as a few inches square to as large as several feed in length and width. Thickness might also vary from a few thousandths of an inch to a quarter of an inch or more. The grid network could contain any number of members that may make a regular checkerboard pattern as in FIG. 1 or a staggered series of rectangles. The grids may also contain diagonal members or even curved members. Any major battery manufacturing company currently will make dozens of different grid designs; many of which might conceivably be constructed using this titanium/lead composite of the present invention.

EXAMPLE

Figure 2:
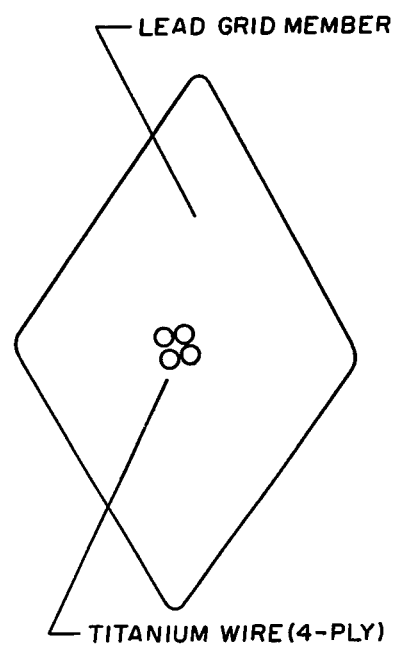
FIG. 2 is a cross section of one of the grid members of FIG. 1, having a 4-ply titanium reinforcement as taught by one of the embodiments of the present invention.

The grid illustrated in FIG. 1 was used in all of the tests described herein and is a fairly simple design. It has thirty-three horizontal ribs (including the frame) which are 5.562 inches long. The ten vertical ribs (including frame) are 16.24 inches long. All grid members have a "diamond-like" shape that is roughly approximated in FIG. 2. The cross-sectional area of both the horizontal and vertical grid members (excluding the frame) is approximately 0.007 square inches. The frames are approximately 0.011 square inches. All of the grid members meet at right angles on centers that are spaced approximately 0.50 inches and 0.60 inches apart. The thickness of the grid is approximately 0.160 inches thick.

A series of novel grid supports were constructed in the following manner. Long lengths of 0.010" diameter ERTi-1 grade titanium wire were cut and wound together to give a tightly wound bundle of 4, 6, or 8 wires. The 4-ply, 6-ply or 8-ply wire was then cut into lengths to fit the vertical or horizontal grid members of the grid shown in FIG. 1. One of the multi-ply wires was hand laid into each grid member and the frame of the mold, the mold was closed and elemental lead was cast around the titanium wires. The casting was then cooled and removed from the mold. A cross-section of the mold would be illustrated by FIG. 2. An additional grid was cast using one 8-ply wound titanium wire in each grid member and one spot-welded 8-ply wound titanium wire loop that forms the reinforcement for the grid frame. A further series of grids were made using 0.030" diameter wire where one single wire was hand laid into each grid member and the frame.

Tensile tests were preformed on titanium wire reinforced lead rod prepared as described above. A 5.00 mm diameter lead rod reinforced with four 0.030" diameter titanium wires (9.28 volume percent loading) was pulled giving an ultimate tensile strength of 10,675 pounds per square inch. This is a strength increase of approximately 500% over pure lead and an increase of approximately 200% over typical lead alloys used in industrial lead-acid batteries. A loading of approximately 10 volume percent titanium will give clearly improved strength.

Again, while most lead-acid batteries are currently constructed using grids of the type as that illustrated by FIG. 1, other forms of construction such as tubular electrodes or flat plate electrodes, i.e., Planté type, can also be used in battery manufacture. Titanium reinforcement of pure lead in other shapes besides grids thus also has utility.

While there have been described what are at present considered to be the preferred embodiments of this invention, it will be apparent to those skilled in the art that various changes and modifications may be made therein without departing from the spirit and scope of the invention. Accordingly, it is intended that the appended claims cover all such changes and modifications which reasonably fall within the true spirit and scope of the instant invention.

We claim:

1. An electrode support structure for a lead-acid battery cell comprising a titanium wire reinforced cast lead composite; said composite further comprising titanium wires embedded in a cast lead matrix.

2. The battery electrode support structure according to claim 1 wherein said titanium comprises from about 5 to about 30% by volume of the support structure.

3. The battery electrode support structure according to claim 1 wherein said titanium comprises from about 10 to about 20% by volume of the support structure.

4. The battery electrode support structure according to claim 1 wherein said titanium is substantially pure unalloyed titanium.

5. The battery electrode support structure according to claim 1 wherein said titanium reinforcement comprises tightly wound bundles of titanium wires.

6. The battery electrode support structure according to claim 1 wherein said titanium reinforcement comprises single strand titanium wires.

7. The battery electrode support structure according to claim 5 wherein said titanium is a binary alloy of titanium and aluminum.

8. The battery electrode support structure according to claim 5 wherein said titanium is a binary alloy of titanium and tin.

9. The battery electrode support structure according to claim 1 wherein said lead comprises elemental lead.

10. The battery electrode support structure according to claim 1 wherein said lead comprises an alloy of lead containing at least 98.5% lead.

11. The battery electrode support structure according to claim 10 wherein said lead contains less than approximately 1.25% of antimony.

12. A positive electrode support structure for a lead-acid battery cell comprising a titanium wire reinforced cast lead composite; said composite further comprising titanium wires embedded in a cast lead matrix.

13. The composite according to claim 12 wherein said titanium comprises from about 5 to about 30% by volume of the support structure.

14. The composite according to claim 12 wherein said titanium comprises from about 10 to about 20% by volume of the support structure.

15. The composite according to claim 12 wherein said titanium is substantially pure unalloyed titanium.

16. The composite according to claim 12 wherein said titanium reinforcement comprises tightly wound bundles of titanium wires.

17. The composite according to claim 12 wherein said titanium reinforcement comprises single strand titanium wires.

* * * * *